US009595700B2

(12) United States Patent
Deponte et al.

(10) Patent No.: US 9,595,700 B2
(45) Date of Patent: Mar. 14, 2017

(54) BATTERY CELL AND METHOD FOR CLOSING THE BATTERY CELL

(71) Applicant: Robert Bosch GmbH, Stuttgart (DE)

(72) Inventors: Rene Deponte, Sersheim (DE); Anselm Berg, Ludwigsburg (DE); Markus Feigl, Markgroeningen (DE); Bernhard Gossen, Freiberg am Neckar (DE); Martin Zywietz, Ludwigsburg (DE); Andreas Eichendorf, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 9 days.

(21) Appl. No.: 14/415,208

(22) PCT Filed: Jun. 12, 2013

(86) PCT No.: PCT/EP2013/062080
§ 371 (c)(1),
(2) Date: Jan. 16, 2015

(87) PCT Pub. No.: WO2014/012715
PCT Pub. Date: Jan. 23, 2014

(65) Prior Publication Data
US 2015/0179993 A1    Jun. 25, 2015

(30) Foreign Application Priority Data
Jul. 16, 2012  (DE) .......................... 10 2012 212 379

(51) Int. Cl.
*H01M 10/052*  (2010.01)
*H01M 2/08*   (2006.01)
(Continued)

(52) U.S. Cl.
CPC ............. *H01M 2/08* (2013.01); *H01M 2/024* (2013.01); *H01M 2/0237* (2013.01);
(Continued)

(58) Field of Classification Search
CPC ........................... H01M 10/0525; H01M 2/08
See application file for complete search history.

(56) References Cited

U.S. PATENT DOCUMENTS 6,410,186 B1 *   6/2002   Tucholski ............. H01M 2/023
                                                          429/171
2012/0214051 A1   8/2012   Tsukuda et al.

FOREIGN PATENT DOCUMENTS

CN   101286577    10/2008
DE   102011109181  2/2013
(Continued)

OTHER PUBLICATIONS

International Search Report for Application No. PCT/EP2013/062080 dated Nov. 11, 2013 (English Translation, 2 pages).

*Primary Examiner* — Stewart Fraser
*Assistant Examiner* — Olatunji Godo
(74) *Attorney, Agent, or Firm* — Michael Best & Friedrich LLP

(57) ABSTRACT

The invention relates to a battery cell (10) having a cell housing (12) which comprises a housing container (14) and a housing cover (16), two electrodes that are arranged in an inner region of the housing container (14), an electrolyte material that is arranged in the inner region of the housing container (14) and that surrounds the electrodes, and two electrical contacts which in each case are electrically coupled to one of the electrodes and which extend from the inner region of the housing container (14) through the housing cover (16) into a region outside of the cell housing (12), wherein the housing cover (16) has an overlap area (18) at an outer edge, in which overlap area the housing cover (16) and an edge region of the housing container (14) are arranged parallel to each other, wherein in the overlap area (18) a flanged seam (20) is formed, in order to close the cell housing (12).

13 Claims, 3 Drawing Sheets

(51) Int. Cl.
*H01M 2/02* (2006.01)
*H01M 2/04* (2006.01)
*H01M 2/26* (2006.01)
*H01M 10/0525* (2010.01)

(52) U.S. Cl.
CPC ....... *H01M 2/0408* (2013.01); *H01M 2/0413* (2013.01); *H01M 2/0439* (2013.01); *H01M 2/263* (2013.01); *H01M 10/0525* (2013.01); *H01M 2220/20* (2013.01); *Y10T 29/4911* (2015.01)

(56) References Cited

FOREIGN PATENT DOCUMENTS

| | | |
|---|---|---|
| JP | H06236750 | 8/1994 |
| JP | 2000150306 | 5/2000 |
| JP | 2002343310 | 11/2002 |
| JP | 2010140715 | 6/2010 |
| WO | 2011153312 | 12/2011 |

\* cited by examiner

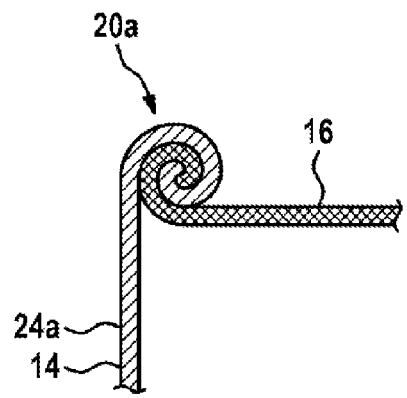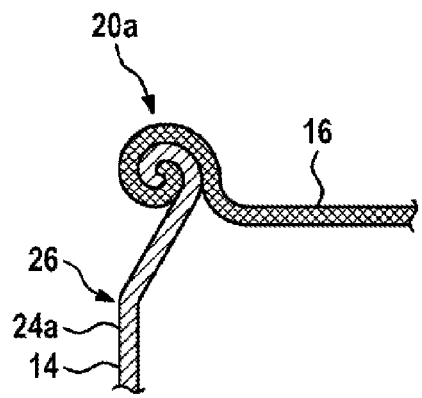
FIG. 2a         FIG. 2b
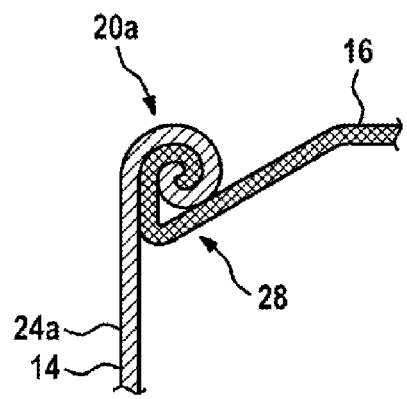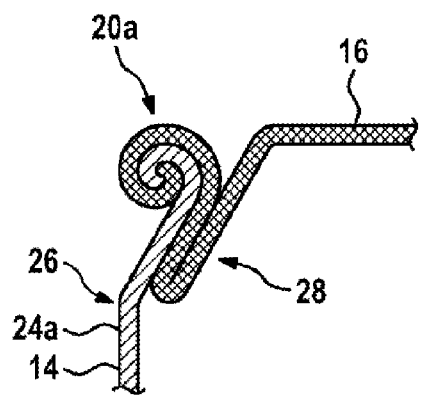
FIG. 2c         FIG. 2d

BATTERY CELL AND METHOD FOR CLOSING THE BATTERY CELL

BACKGROUND OF THE INVENTION

The present invention relates to a battery cell having a cell housing that comprises a housing container and a housing cover, two electrodes that are arranged in an inner region of the housing container, an electrolyte material that is arranged in the inner region of the housing container and surrounds the electrodes, and two electrical contacts that are electrically coupled in each case to one of the electrodes and extend from the inner region of the housing container through the housing cover into a region outside the cell housing.

Moreover, the present invention relates to a method for sealing a battery cell, wherein the battery cell comprises a cell housing that comprises a housing container and a housing cover, two electrodes that are arranged in an inner region of the housing container, an electrolyte material that is arranged in the inner region of the housing container and surrounds the electrodes, and two electrical contacts that are electrically coupled in each case to one of the electrodes and extend from the inner region of the housing container through the housing cover into a region outside the cell housing.

A battery cell is an electrochemical energy storage device and an energy converter. As the battery is discharged, stored chemical energy is converted into electrical energy by means of an electrochemical reaction. The electrical energy can be used by a consumer that is electrically coupled to the battery.

In motor vehicles, a battery is used inter alia for the purpose of supplying current for the head lamps, the on-board electronics and for the starter for the purpose of starting the internal combustion engine. In electric or hybrid vehicles, the battery is also used as an energy storage device for the electrical drive of the motor vehicle.

The batteries (for example lithium ion rechargeable batteries) that are used in motor vehicles often comprise a prismatic shape in order to be able to maximize the use of the available volume. A flat-pressed wrap is provided inside the housing and said flat-pressed wrap is rolled from an aluminum film, a copper film and also two synthetic material or ceramic films that are used as diaphragms. The aluminum film and the copper film are coated with reactive cathode and anode materials. The housing is filled with a liquid electrolyte after the wrap has been introduced and prior to the pressure-tight sealing arrangement being provided.

The cathode film and the anode film of the wrap are not positioned in a matching arrangement but rather are positioned slightly offset with respect to one another in order to render it possible to provide an electrical contact to the two films. This renders it possible at the respective film to tap the negative voltage at one open narrow side of the wrap and to tap the positive voltage at the other opposite-lying narrow side. The overlapping film strips are contacted by means strip-shaped sheet metal parts that are welded on and are embodied from copper and/or aluminum, the so-called current collectors. The cell housing of a battery usually comprises a housing container and a housing cover that are produced by way of example from aluminum or stainless steel. Various aspects are to be considered when providing the contact to the above mentioned current collectors inside the cell housing and in the case of the feedthrough of the current paths through the housing towards the outside. For example, it is necessary to first electrically insulate the current paths with respect to the metal cell housing. Furthermore it is necessary to ensure the leak-tightness of the current feedthrough through the cell housing. In particular, it is necessary by way of example to prevent the electrolyte material that is located in the cell housing from outgassing into the atmosphere. Moreover, the cell housing should, without becoming damaged, be able to withstand mechanical loadings (mainly an internal pressure and pressure forces that arise by virtue of binding multiple batteries together to form one cell module) that act upon the cell housing. Since a large number of battery cells are used in a motor vehicle, it is desirable to achieve a cost-effective solution for sealing the cell housing and for absorbing mechanical loadings at the site where the housing container is connected to the housing cover.

In the case of known battery cells, the housing container and the housing cover are connected by means of a laser weld seam. The laser weld seam also assumes the function of sealing the cell housing. One problem in the case of a laser weld seam resides in the fact that during the welding process so-called weld beads (welding faults) can arise. These weld beads prevent the battery cells from lying directly one against the other. Due to the fact that the outer surfaces of the battery cells do not lie completely flat one against the other, it is not possible to ensure that the battery cells are correctly assembled to form one cell module. Furthermore, the cell housing is deformed as a result of the effects of heat that is produced during the welding process. This deformation also has a negative effect on the process of assembling the battery cells.

SUMMARY OF THE INVENTION

The present invention therefore provides a battery cell having a cell housing that comprises a housing container and a housing cover, two electrodes that are arranged in an inner region of the housing container, an electrolyte material that is arranged in the inner region of the housing container and surrounds the electrodes, and two electrical contacts that are electrically coupled in each case to one of the electrodes and extend from the inner region of the housing container through the housing cover into a region outside the cell housing, wherein the housing cover comprises an overlapping region at an outer edge and the housing cover and a boundary region of the housing container are arranged parallel to one another in said overlapping region wherein a crimped seam is formed in the overlapping region in order to seal the cell housing.

Furthermore, the present invention provides a method for sealing a battery cell, wherein the battery cell comprises a cell housing that comprises a housing container and a housing cover, two electrodes that are arranged in an inner region of the housing container, an electrolyte material that is arranged in the inner region of the housing container and surrounds the electrodes, and two electrical contacts that in each case are electrically coupled to one of the electrodes and extend from the inner region of the housing container through the housing cover into a region outside the cell housing, wherein the housing cover is arranged on the housing container in such a manner that an outer edge of the housing cover and a boundary region of the housing container are arranged parallel to one another in an overlapping region and wherein a crimped seam is formed by means of crimping the housing cover and the housing container in the overlapping region in order to seal the cell housing.

In terms of the present invention, the term 'crimping the housing cover and the housing container' is understood to mean that the housing cover and the housing container are bent together one over the other.

In contrast to a welding process, the crimping process in the overlapping region does not produce any beads or bulges. As a consequence, the outer surfaces of the battery cells lie in a planar manner one against the other when binding multiple battery cells together to form a cell module. This renders it possible to correctly assemble a cell module.

Furthermore, the crimping process does not produce any relevant heat that could lead to a deformation of the cell housing. As a consequence, it is ensured in addition that the outer surfaces of the battery cells can lie completely flat one against the other.

In addition, the crimped seam has a high degree of mechanical stability. As a consequence, it is possible for high mechanical loads to be absorbed by the battery cell without the connection between the housing container and the housing cover becoming damaged. Also, the crimped seam can be produced in a very simple and cost-effective manner.

It is particularly preferred if the crimped seam is formed by means of crimping the housing cover and the housing container in the overlapping region.

The housing cover and the housing container are arranged essentially parallel to one another in the overlapping region. The crimped seam is produced by means of bending over the housing cover and the housing container together in the overlapping region. Consequently, the site where the housing container is connected to the housing cover can be sealed in a reliable manner.

In a further embodiment, a synthetic material layer is arranged between the housing cover and the housing container at least in the overlapping region.

It is possible to seal the battery cell in a further improved and more reliable manner by means of clamping the synthetic material layer between the housing cover and the housing container. Consequently, it is possible by way of example to prevent the electrolyte material that is located in the battery cell from escaping from the battery cell.

In accordance with a further embodiment, an outer peripheral surface of the crimped seam is formed by one part of the housing container.

In this embodiment, the crimped seam is formed by means of crimping the housing cover and the housing container in the direction of a housing cover middle or rather in the direction of the housing cover. The crimped seam is produced in the overlapping region.

In a further embodiment, an outer peripheral surface of the crimped seam is formed by one part of the housing container.

In this embodiment, the crimped seam is produced by crimping the housing cover and the housing container in a direction away from the housing cover middle or rather in the direction of the housing container. It is preferred that the housing container is bent in such a manner that the outer surfaces of multiple battery cells can lie flush one against the other.

In accordance with a further embodiment, the outer peripheral surface of the crimped seam is essentially flush with a lateral housing wall of the cell housing.

Irrespective of whether the crimped seam is produced by means of crimping the housing cover and the housing direction in the direction of the housing cover middle or in a direction that is away from the housing cover middle, it is ensured that the outer peripheral surface of the crimped seam is flush with a lateral housing wall of the cell housing. As a consequence, it is ensured that the outer surfaces of the battery cells can lie completely flat one against the other. This renders it possible to correctly assemble the battery cells to form a cell module.

In a further embodiment, a fold is formed in the housing cover adjacent to the crimped seam.

The fold provides additional reinforcement to the crimped seam and consequently renders it possible to connect the housing cover to the housing container. This produces increased stability and reliability of the housing cell.

In a preferred embodiment of the method, prior to arranging the housing cover on the housing container, a synthetic material layer is arranged on the housing cover and/or the housing container at least in the overlapping region in such a manner that the synthetic material layer is arranged between the housing cover and the housing container after the cell housing has been sealed.

The synthetic material layer can be applied to the housing cover and/or the housing container. Consequently, the battery cell can be sealed in a reliable manner. The electrolyte material is prevented from escaping from the battery cell.

In accordance with a further embodiment of the method, the crimped seam is formed by bending the two parts over in the overlapping region in the direction of the housing cover.

In this embodiment, the housing covering and the housing container are crimped in the overlapping region in the direction of the housing cover or rather the housing cover middle. This process does not produce any protruding beads on the lateral housing walls. The lateral surfaces of the battery cells lie one against the other in a planar manner when assembling said battery cells to form a cell module.

In accordance with a further embodiment of the method, the crimped seam is formed by bending over the overlapping region in the direction of the housing container.

As a consequence, the housing cover and the housing container are crimped in the overlapping region in the direction of the housing container or rather in a direction that is away from the housing cover middle. The lateral surfaces of the battery cell are preferably bent in such a manner that the lateral surfaces of the cells can lie completely flat one against the other when binding said battery cells together to form a cell module.

It goes without saying that the features, characteristics and advantages of the device in accordance with the invention can also refer accordingly to the method in accordance with the invention or rather can be used according to the method in accordance with the invention.

In addition, it goes without saying that the above mentioned features and the features that are yet to be described hereinunder can be used not only in the respective mentioned combination but rather also in other combinations or as stand-alone without departing from the scope of the invention.

BRIEF DESCRIPTION OF THE DRAWINGS

FIG. 2 illustrates different embodiments of the crimped seam; and

DETAILED DESCRIPTION

Figure 1:
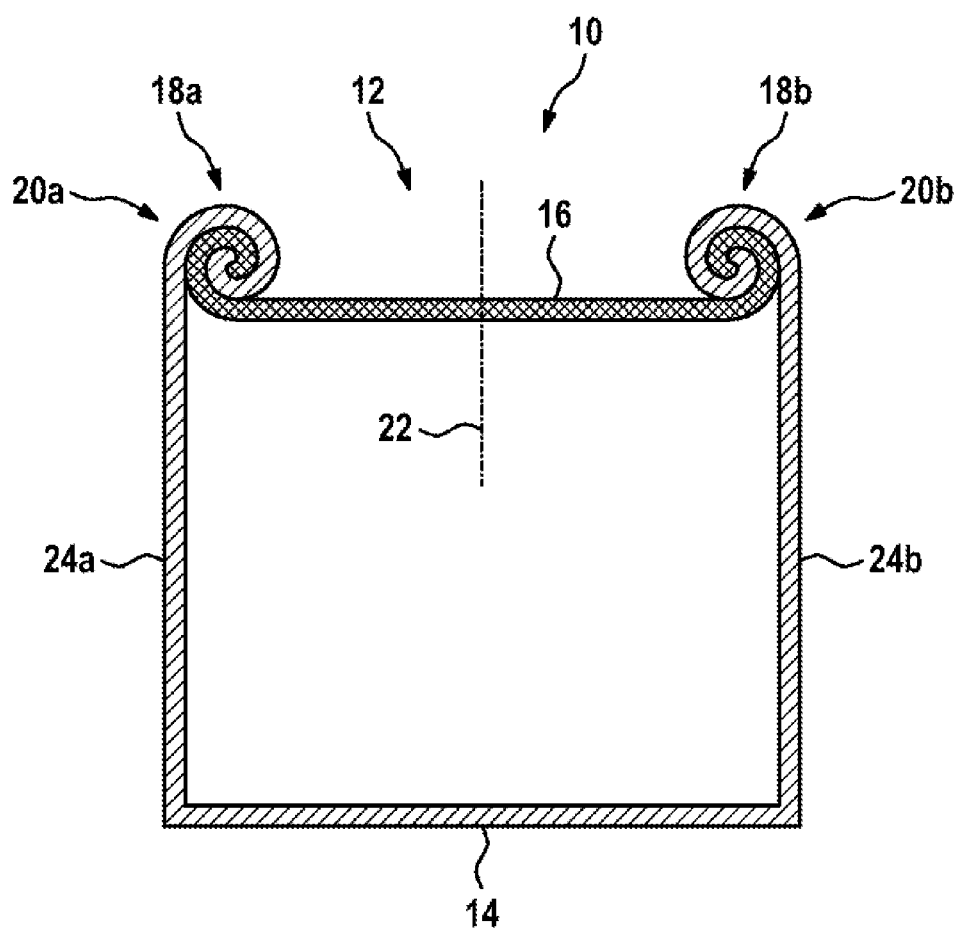
FIG. 1 illustrates a schematic view of a battery cell that is sealed in accordance with the invention by a crimped seam.

FIG. 1 illustrates a schematic view of a battery cell that is designated in general by the numeral 10. The battery cell 10 comprises a cell housing 12 having a housing container 14 and a housing cover 16. By way of example, a cell wrap, not illustrated in FIG. 1, is located inside the cell housing 12 and said cell wrap is rolled from an aluminum film, from a copper film and also two synthetic material or ceramic films that are used as diaphragms. The aluminum and copper film are coated with active cathode and anode materials. Moreover, by way of example, an electrolyte material that surrounds the electrodes of the cell wrap is located in an inner region of the housing container 14. Contact with the electrodes of the cell wrap is provided by way of welded-on electrical contacts embodied from copper and/or aluminum. The electrical contacts, not illustrated in FIG. 1, extend from the electrodes that are arranged in the inner region of the housing container 14 through the housing cover 16 as far as into a region outside the cell housing 12.

It is to be ensured during the construction of the battery cell 10 that the cell housing 12 is sealed in a reliable manner. By way of example, the electrolyte material that is located in the cell housing 12 must be prevented from gassing out and from passing into a region outside the battery cell 10. In addition, the cell housing 12 should be constructed in such a manner that high mechanical loadings can also be absorbed without causing further damage. The mechanical loadings occur for example as a result of an internal pressure of the battery cell 10 or also as a result of binding multiple battery cells 10 together to form a cell module. The functions of sealing the battery cell and of absorbing mechanical loadings place in particular high demands on the site where the housing container 14 is connected to the housing cover 16.

In the case of known battery cells, the housing container 14 and the housing cover 16 are welded one to the other in order to be able to meet the above mentioned demands. However, so-called weld beads are generally formed during the welding process. Furthermore, heat that is produced during the welding process can cause the cell housing to deform. This prevents the battery cells from being able to lie in a planar manner one against the other. It is thus not possible to assemble the battery cells properly to form a cell module.

The housing cover 16 therefore comprises in accordance with the invention an overlapping region 18 on an outer edge, and the housing cover 16 and a boundary region of the housing container 14 are arranged in parallel to one another in said overlapping region. The housing cover 16 and the housing container 14 are crimped in the overlapping region 18 and thus form a crimped seam 20. In other words, the housing cover 16 and the housing container 14 are bent together one with the other in the overlapping region 18. The crimped seam 20 in this exemplary embodiment is formed by crimping the housing cover 16 and the housing container 14 in the direction of a housing cover middle 22 or rather in the direction of the housing cover 16. In addition, the crimped seam 20 is designed so that an outer peripheral surface of the crimped seam 20 is essentially flush with the later housing walls 24 of the cell housing 12. As a consequence, the lateral housing walls 24 of multiple battery cells 10 can be placed in a planar manner one against the other. Multiple battery cells 10 can thus be easily bound together to form a cell module.

In addition, it is possible in the overlapping region 18 to clamp a synthetic material film between the housing cover 16 and the housing container 14. This synthetic material film renders it possible to improve the manner in which the cell housing 12 is sealed. The electrolyte material can therefore not escape from the cell housing 12.

In addition, the crimped seam 20 provides additional mechanical reinforcement of the cell housing 12 and consequently provides a greater degree of stability with respect to mechanical loadings that can arise for example when stacking the battery cells 10.

FIG. 2 illustrates different embodiments of the crimped seam 20. In particular, the figure illustrates different embodiments of the crimped seam 20a that is shown top left-hand in FIG. 1. The embodiments of the crimped seam 20a described in FIG. 2 can however also be applied in a similar manner to the crimped seam 20b shown in FIG. 1.

FIG. 2a illustrates one embodiment of the crimped seam 20 wherein an outer peripheral surface of the crimped seam 20 is formed by one part of the housing container 14. As a consequence, troublesome beads that prevent the battery cells 10 from lying flush one against the other are not produced on the lateral housing wall 24. In the case of the embodiment of the crimped seam 20 shown in FIG. 2b, an outer peripheral surface of the crimped seam 20 is formed by one part of the housing cover 16. So that the outer peripheral surface of the crimped seam 20 is essentially flush with the lateral housing wall 24, the housing container 14 in the region of the crimped seam 20 comprises a bend 26. Consequently, the battery cells 10 can also be stacked in a planar manner one on top of the other in this embodiment and therefore by way of example can be bound together correctly to form a cell module.

The embodiments illustrated in FIG. 2c and FIG. 2d correspond essentially to the embodiments described in FIGS. 2a and 2b. However, the embodiments shown in FIGS. 2c and 2d comprise in addition a fold 28 that is embodied in the housing cover 16 and adjacent to the crimped seam 20. The fold 28 produces a greater degree of mechanical stability of the battery cell 10. Mechanical loadings that arise for example when stacking the battery cells 10 can be absorbed in an improved manner.

Figure 3:
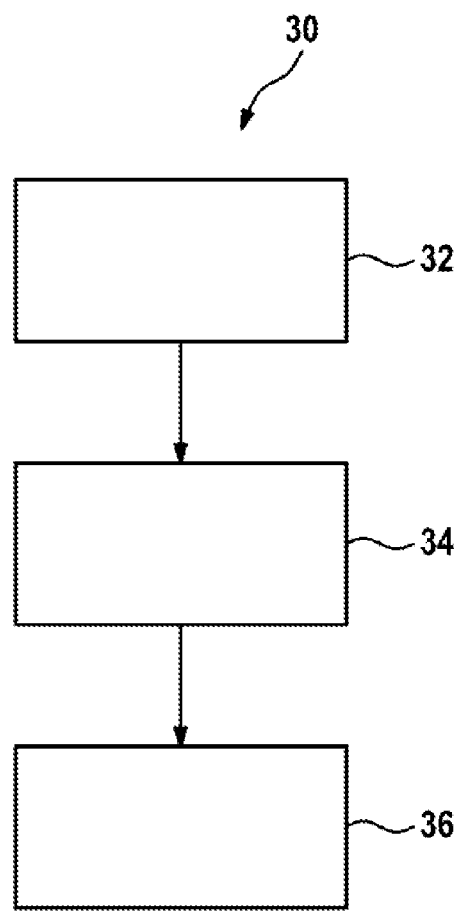
FIG. 3 illustrates a diagram for explaining an embodiment of a method in accordance with the invention.

FIG. 3 illustrates a flow chart for the purpose of explaining one embodiment of a method in accordance with the invention 30. The method 30 is used for the purpose of closing the battery 10 by means of the crimped seam 20.

In step 32, first a synthetic material layer is arranged on the housing cover 16 and/or the housing container 14. This synthetic material layer is used to improve the manner in which the cell housing 12 is sealed. For this purpose, the synthetic material layer is preferably arranged in the overlapping region 18. In addition, the synthetic material layer can also be applied in different regions of the housing cover 16 and of the housing container 14. It is to be ensured that the synthetic material layer is arranged in such a manner that after the cell housing 12 is sealed said synthetic material layer is arranged at least in the overlapping region 18 between the housing cover 16 and the housing container 14. Consequently, the battery cell 10 can be sealed in a reliable manner. Electrolyte material is prevented from escaping.

In step 34, the housing cover 16 is arranged on the housing container 14 in such a manner that an outer edge of the housing cover 16 and a boundary region of the housing container 14 are arranged in parallel to one another in the overlapping region 18.

Finally, the cell housing 12 is sealed in step 36 in that the housing cover 16 and the housing container 14 are crimped in the overlapping region 18. The crimping process forms a crimped seam 20 in the overlapping region 18. The crimped seam 20 can be produced by means of crimping the housing cover 16 and the housing container 14 in the direction of the housing cover middle 22 or in a direction away from the housing cover middle 22.

In addition, the fold 28 can be embodied in the housing cover in order to increase the mechanical stability of the battery cell 10.

What is claimed is:

1. A battery cell having
   a cell housing that comprises a housing container and a housing cover,
   two electrodes that are arranged in an inner region of the housing container,
   an electrolyte material that is arranged in the inner region of the housing container and surrounds the electrodes, and
   two electrical contacts that are electrically coupled in each case to one of the electrodes and extend from the inner region of the housing container through the housing cover into a region outside the cell housing,
   wherein the housing cover comprises an overlapping region at an outer edge and the housing cover and a boundary region of the housing container are arranged parallel to one another in said overlapping region, wherein a crimped seam is formed in the overlapping region in order to seal the cell housing,
   and wherein the crimped seam is formed by crimping the housing cover and the housing container toward the housing cover.

2. The battery cell as claimed in claim 1, wherein the crimped seam is formed by crimping the housing cover and the housing container in the overlapping region.

3. The battery cell as claimed in claim 1, wherein a synthetic material layer is arranged between the housing cover and the housing container at least in the overlapping region.

4. The battery cell as claimed in claim 1, wherein an outer peripheral surface of the crimped seam is formed by one part of the housing container.

5. The battery cell as claimed in claim 1, wherein an outer peripheral surface of the crimped seam is formed by one part of the housing cover.

6. The battery cell as claimed in claim 4, wherein the outer peripheral surface of the crimped seam is essentially flush with a lateral housing wall of the cell housing.

7. The battery cell as claimed in claim 1, wherein a fold is embodied in the housing cover adjacent to the crimped seam.

8. A method for sealing a battery cell, wherein the battery cell comprises a cell housing that comprises a housing container and a housing cover, two electrodes that are arranged in an inner region of the housing container and surrounds the electrodes, and two electrical contacts that are electrically coupled in each case to one of the electrodes and extend from the inner region of the housing container through the housing cover into a region outside the cell housing, wherein the method comprises the steps:
   arranging the housing cover on the housing container in such a manner that an outer edge of the housing cover and a boundary region of the housing container are arranged parallel to one another in an overlapping region, and
   forming a crimped seam by crimping the housing cover and the housing container in the overlapping region toward the housing cover in order to seal the cell housing.

9. The method as claimed in claim 8, wherein prior to arranging the housing cover on the housing container a synthetic material layer is arranged on at least one of the housing cover and the housing container at least in the overlapping region in such a manner that after the cell housing is sealed the synthetic material layer is arranged between the housing cover and the housing container.

10. The battery cell as claimed in claim 5, wherein the outer peripheral surface of the crimped seam is essentially flush with a lateral housing wall of the cell housing.

11. The method as claimed in claim 9, wherein prior to arranging the housing cover on the housing container the synthetic material layer is arranged on both of the housing cover and the housing container at least in the overlapping region in such a manner that after the cell housing is sealed the synthetic material layer is arranged between the housing cover and the housing container.

12. The method as claimed in claim 9, wherein prior to arranging the housing cover on the housing container the synthetic material layer is arranged on the housing cover at least in the overlapping region in such a manner that after the cell housing is sealed the synthetic material layer is arranged between the housing cover and the housing container.

13. The method as claimed in claim 9, wherein prior to arranging the housing cover on the housing container the synthetic material layer is arranged on the housing container at least in the overlapping region in such a manner that after the cell housing is sealed the synthetic material layer is arranged between the housing cover and the housing container.

* * * * *